INVENTORS
AMOS A. SPADY, JR.
FRANK G. READ

ATTORNEYS

INVENTORS
AMOS A. SPADY, JR.
FRANK G. READ

ATTORNEYS

Feb. 3, 1970　　　A. A. SPADY, JR., ET AL　　　3,493,153
BACKPACK CARRIER
Filed Oct. 10, 1967　　　　　　　　　　　　　3 Sheets-Sheet 3

INVENTORS
AMOS A. SPADY, JR.
FRANK G. READ
BY
ATTORNEYS

United States Patent Office 3,493,153
Patented Feb. 3, 1970

3,493,153
BACKPACK CARRIER
Amos A. Spady, Jr., and Frank G. Read, Hampton, Va., assignors to the United States of America as represented by the Administrator of the National Aeronautics and Space Administration
Filed Oct. 10, 1967, Ser. No. 674,357
Int. Cl. A45d *3/10;* A47d *13/02*
U.S. Cl. 224—25                    5 Claims

ABSTRACT OF THE DISCLOSURE

A backpack carrier for a lunar explorer featuring support legs allowing assumption without bending by a user, and a retraction mechanism for the legs to provide freer movement, also featuring convertibility to a wheeled carrier and a clearance cavity allowing securing of the backpack over an already in-place load.

---

The invention described herein was made by employees of the United States Government and may be manufactured and used by or for the Government for governmental purposes without the payment of any royalties thereon or therefor.

This invention concerns a backpack carrier for use by humans, and more specifically deals with a carrier which is especially suitable for use by astronauts in a lunar environment.

The exploration of the lunar surface may require the astronaut to carry various equipment, tools, instruments, etc., across the lunar surface. While modern day research has indicated that the most efficient place for a man to carry a load is on his back, conventional backpack carriers have certain deficiencies which become severe in the context of use by potential lunar surface explorers. One of these is the dexterity required to hoist the load to the carrier's back. The astronaut, already encumbered with space suit and life support equipment, may find this an intolerably clumsy procedure. Further, since the initial hoisting effort required is much greater than that required to merely carry the load, the upper limit of the load possible to be handily transported in this manner may be significantly reduced. A second deficiency is the rather limited use of the ordinary backpack structure. Owing to severe weight limitations, it is desirable that such a carrier structure be flexible and versatile in aiding the carrying out of the away-from-the-ship mission. The backpack should be capable of performing a variety of tasks, such as operating as a working surface or rescue vehicle. Another problem is that encountered in attempting to assume a backpack carrier over an already in-place load, such as life support equipment likely to be worn by such an explorer. The usual result would be to shift center gravity of the load away from the carrier to an extent that walking would be made difficult.

Therefore it is an object of the present invention to provide a backpack carrier which may be donned without the necessity of hoisting the load up from the ground.

It is another object to provide a backpack carrier in which the load may be assumed by a simple procedure requiring little effort or dexterity on the part of the carrier.

It is a further object to provide a versatile and adaptable backpack structure which is usable as a rescue vehicle.

Yet another object is to provide a backpack structure which may be used as a convenient working surface upon deployment in the field.

A further object is to provide a specially contoured backpack carrier which may be efficiently emplaced over equipment already in position on the carrying individual.

These and other objects will become apparent upon a reading of the specification and drawing are accomplished by providing a multilegged support structure which positions the load so as to be at the proper height for securing to the bearer. The pack frame is specially contoured for clearance of life support or other equipment, and a wheel attachable to the leg supports are provided in order to convert the assembly to a wheeled vehicle. A retraction mechanism and selective controls for the legs are provided in order to enable freer transport of the backpack carrier across a rugged terrain by a wearer.

While there is shown in the drawings and described in the specification a preferred embodiment designed to be suitable for use in a lunar environment, it is to be understood that the same is illustrative of the invention and the invention is capable of modification and change, and comprehends other details of construction without departing from the spirit thereof, as for example redesign for a terrestrial environment.

In the drawings, FIG. 1 is a front elevation of the backpack carrier.

Figure 1:
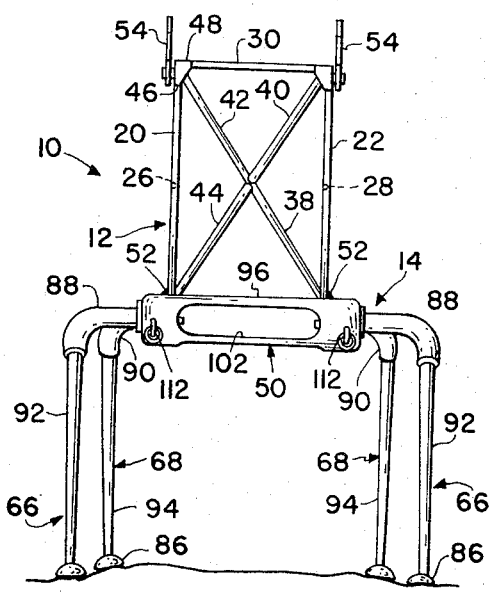

Referring now to the drawings, wherein like reference numerals indicate identical or corresponding parts throughout the several views, and particularly to FIG. 1, the backpack carrier assembly is indicated generally as 10. This assembly is composed of two major components, the carrier frame assembly 12, and the support assembly 14.

Figure 7:
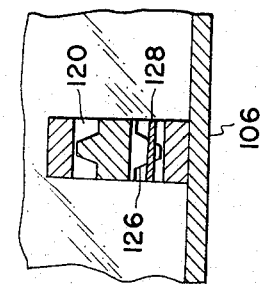
FIG. 7 is a partial view of the section at the plane indicated by line 7—7 in FIG. 6.

The carrier frame assembly 12, as best seen in FIGS. 1–4, is a generally channel-shaped framework, wherein tubular members 16 and 18 together with cross members 38, 40, 42 and 44 form the bottom, tubular members 20, 22, 26 and 28 form the sides, while members 30, 32, 34 and 36 form an end wall. These members may be constructed of a thin-walled light metal tubing, such as magnesium, as the load under lunar gravity conditions would not be unduly heavy, and the weight of the carrier frame is of course critical since it must be transported at great expense to the lunar site, and also reduces the net load capacity of the explorer. Assembly is accomplished by weldments 46 to corner blocks 48 and at junctions 49, whereby a lightweight but sturdy frame is formed which is open at the front but closed in at the back. The carrier frame 12 is secured to the support assembly 14, hereinafter to be described, by extending the corner tubular members 16, 18, 20 and 22 down into openings provided for this purpose in platform assembly 50, as best seen in FIGS. 5 and 7. These members then may be welded at convenient points, such as 52, or bolted to platform assembly 50, if a removable carrier frame assembly is desired in order to provide a more convenient working surface.

Figure 2:
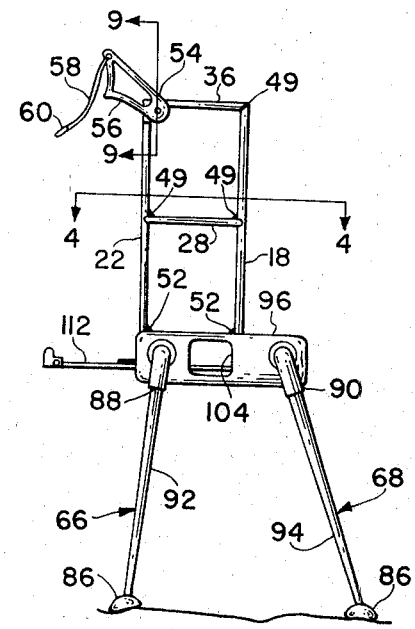
FIG. 2 is a side elevation of this same structure.

The carrier frame 12 has rotatably mounted thereon a pair of shoulder supports 54, as best seen in FIG. 2. These shoulder supports are contoured at 56 in order to engage the curvature of a user's body contour and are included in order to provide a convenient means for detachably securing the frame 12 to the wearer, as by a strap 58 and clip 60, designed to cooperate with a body harness or suit-carried rings.

Figure 3:
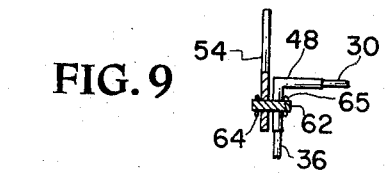
FIG. 3 is a plan view of the carrier frame.
Figure 9:
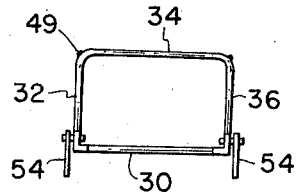
FIG. 9 is a partial view of the section at plane indicated by line 9—9 in FIG. 2.

As best seen in FIG. 9, the shoulder supports 54, are rotatably mounted on the corner blocks 48, by means of a pin 62, passing through corner block 48 and pressed onto shoulder support 54. A retaining pin 64 may be added in order to insure that the pin 62 will not be separated from the shoulder suport 54. A spring wire loop 65 is secured to and disposed surrounding pin 62 and secured to corner block 48, and provides an upward resilient bias to the shoulder support 54, so that it will remain clear of a user's shoulder until pulled down into an operative position. A detent mechanism (not shown) could also be incorporated to hold member 54 in the operative position.

The support assembly 14 as seen in FIGS. 1 and 2 consists of a platform assembly 50 and a group of four legs, a pair of front legs 66 and a pair of rear legs 68, rotatably mounted to the platform assembly 50.

Figure 10:
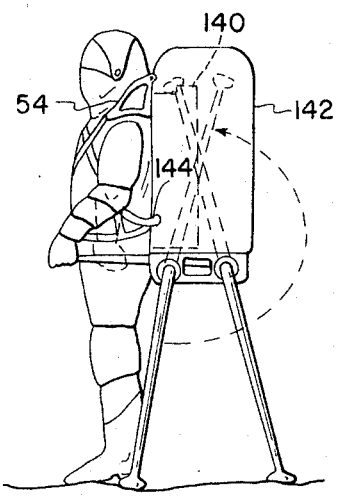
FIG. 10 is a side elevation of the backpack carrier carrying a load as assumed by a wearer.

The legs 66 and 68 may also be constructed of light metal thin-walled tubing such as magnesium, and preferably have removable ball or die plate jointed feet 86, of a well-known construction connected to the ends. The legs are of two-part construction having main members 92 and 94, and elbow members 88 and 90 connected thereto. These elbow members 88 and 90 serve to extend the legs beyond the area normally occupied by a load so that the legs may be rotated about their connections without creating interference between them and the load, since loads may occupy space on the sides of the carrier frame. In addition, the elbows 88 extend out further than elbows 90, so that the legs may clear each other in the folded position (see FIG. 10).

Figure 8:
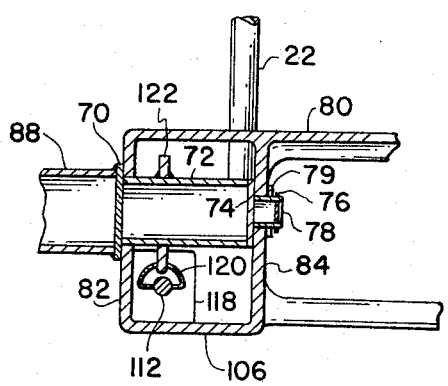
FIG. 8 is a partial view of the section at the plane indicated by the line 8—8 in FIG. 4.

The mounting arrangement for the legs is shown in FIG. 8, which is typical of all of the legs. The elbow 88 has an end thrust plate 70 welded thereto which has an axle tube 72 integral therewith. The axle tube 72 has an end plate 74 secured thereto, which has an axle tube 76 integral therewith. This assembly is inserted into clearance holes in a platform housing 80, in sidewalls 82 and 84, and retained by means of a pin 78 and thrust washer 79, or other suitable retaining means.

Thus a simple pivotal connection to the platform assembly has been provided which allows positioning of the leg members 66 and 68 extending from said carrier frame 12 and platform assembly 50, and also folded upwardly substantially coextensive with the carrier frame 12 and platform assembly 50.

The platform assembly 50 has a main platform member 80, having a flat top surface 96, which operates as a load support when a load is in place, and also may be used as a convenient working surface in the field when the load is deployed. A solid hinged plate (not shown) could be provided to produce an extended working surface. This surface is contoured at 98 in the rear, for a purpose to be hereinafter disclosed and at 100 in the front, in order to more effectively engage a wearer's back. Thus this surface and the leading surfaces of tubes 20, 22 and 30 provide a plane or surface area for engagement with a wearer's back, while providing a central opening or cavity for already in-place loads.

The platform member 80 has downwardly extending edges along all four sides with cutouts at 102 and 104, and folds in at the sides to form a bottom ledge 106 on each side as far in as the cutout 102. A pair of sidewalls 84 (FIG. 8) close in these sections to form a pair of box beams, with internal webs 108 and 110 on each side (FIG. 5) dividing each of these into compartments.

Figure 5:
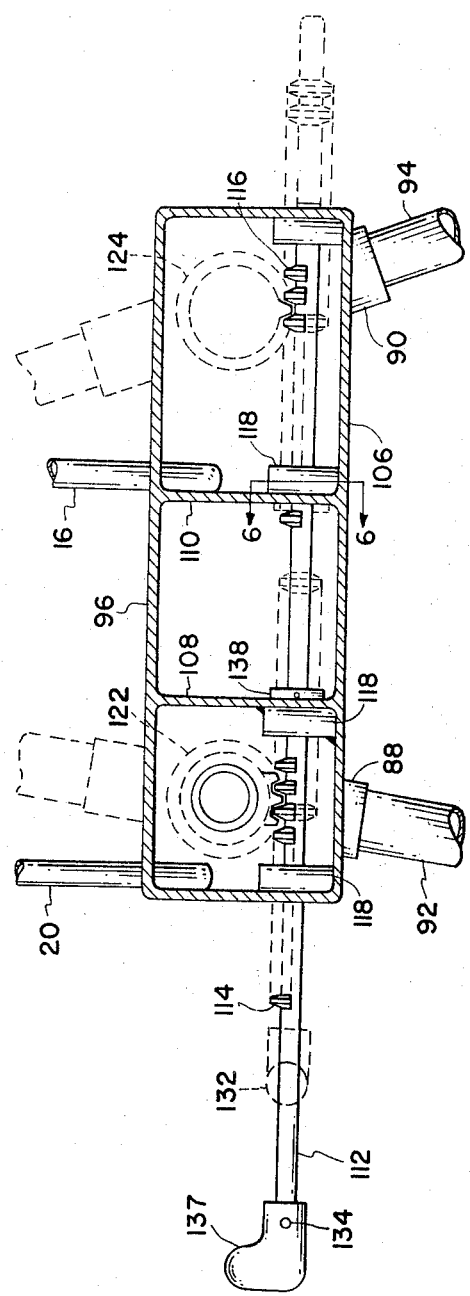
FIG. 5 is a sectional view taken along the line 5—5 of FIG. 4.
Figure 6:
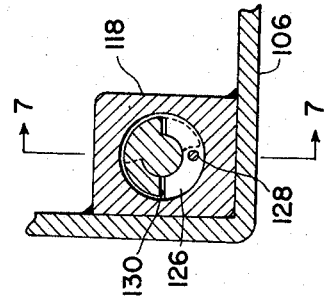
FIG. 6 is a partial view of the section at the plane indicated by the line 6—6 in FIG. 5.

Each of these box beam sections houses a retraction mechanism for the legs 66 and 68, as best seen in FIG. 5. An operating rod 112 is disposed passing through each of these sections. Machined thereon, are a pair of semicircular rack sections 114 and 116, a typical cross-section of which is shown in FIG. 6. A series of journal blocks 118 are provided having openings 120 (FIGS. 6 and 7) machined to provide a sliding clearance passage for the semicircular rack, as seen in FIG. 6. These journal blocks 118 are fixed to the walls and webs in alinement with each other to allow the operating rod to pass through freely. Fixed on axle 72, so as to engage racks 114 and 116, are a pair of complementary pinions 122 and 124, as shown in FIGS. 5 and 8. It can readily be seen that longitudinal movement of the operating arm will cause rotation of the legs 66 and 68 which are connected to pinions 122 and 124, thus providing a simple, rapid retraction mechanism. Since the rod extends forwardly at a substantial angle to and distance from the carrier frame, it is accessible to a wearer with the carrier frame in place on his back.

In order to secure the legs in any given position, journal blocks 118 are provided with grooves 126 on the opposite side of the clearance openings, and a central stop pin 128. Simply by rotating an operating rod 112 about its longitudinal axis, a portion of racks 112 and 114 enter into a groove or grooves 126, depending on the register of the rack portions 112 and 114 with the blocks 118, and secure against further longitudinal movement of the rod 112. Since by virtue of the semicircular configuration of the racks 112 and 114, pinions 122 and 124 remain engaged, and thus in turn legs 66 and 68 are secured against movement. This operation together with the retraction stroke, is shown in phantom in FIGS. 5 and 6. It is noted that with turning movement of the operating rod 112 in either direction a lock is effected, and register with at least two slots 126 is possible at all positions of the operating rods 112. A clearance 130 in openings 120 is allowed so that slight inadvertent turns of the rods 112 will not result in lockup.

To facilitate manipulation of the rod 112, a handle 132 is provided pinned at 134 to connect it with the rod 112.

A stop 138 limits the stroke to that of the rack, to prevent overshoots and as an indicator of the piston of the rod 112.

The basic use of the backpack carrier should be obvious from the foregoing description. To don the unit, an astronaut wearing a life support system 140 (FIG. 10), simply backs into the unit, using the operating rods 112 as guides. Since the carrier frame 12 is open at this portion, the life support system nests within the framework, allowing the load 142, previously secured to the carrier frame and support system, to surround it, thus maintaining a center of gravity reasonably close to the wearer's back. The backpack carrier may be secured to wearer by means of the shoulder support assembly 54 and by a conventional strap assembly 144 to the load. Having secured the unit, the wearer simply leans forward slightly, pushes in the operating rods 112, and secures the legs in their folded position. This provides increased ground clearance for easier movement on rugged terrain. It can be seen that the position of the operating rods 112, extending forwardly at a substantial angle to the legs, aids both in positioning the wearer with respect to the load, and also allows their manipulation by the wearer with the backpack carrier in position. Thus with a minimum of movement and effort, a load which may be relatively massive by earth standards may be assumed, leaving the wearer's hands free for other activity. Upon reaching a remote site, the procedure is simply reversed by extending the legs, securing them, and releasing the shoulder support and strap systems. The backpack carrier now provides a convenient working surface which is at an advantageous level for activity by an erect human being. This feature is not of inconsiderable advantage, as bending movements in a space suit may be very laborious, clumsy, and time-consuming.

It should be emphasized at this point, that this basic concept is not viewed as limited to lunar exploration applications, but is usable to great advantage in many terrestrial applications, such as improved ordinary hiking pack frames, or military applications, where heavy equipment must be bivouaked into inaccessible areas, frequently over regular field packs. The system would be particularly advantageous where the nature of the load would require a support system when deployed, such as movie or television equipment, or would be desirable, such as radio or portable radar equipment. The platform would be a boon to the camper-hiker as providing extremely convenient shelf and table space.

In conjunction with this point, it should also be noted that the arrangement described is susceptible of infinite variations and refinement within the basic concept, and the invention is by no means limited to the specific structure disclosed.

For example, the retraction mechanism, designed for near-weightless legs, operates with the range of movement minimized. It is obvious such a mechanism may not be suitable for terrestrial applications, as the mechanical advantage is very low, and so a geared or ratchet pumping mechanism could be substituted with a larger leverage. Another possibility would be to provide a pulley and cord system, selecting a desired mechanical advantage. Thus it is apparent that this basic mechanism is capable of any number of other modifications to gain the result desired.

Further, the legs may be telescoped rather than articulated, or spring loaded to aid retraction.

The number of legs could be varied, with any number as desired, such as three or five.

A sheet metal support structure could be substituted for the leg members.

As before noted, a hinged plate extension could be provided for the platform.

The overall structure could be much simplified, eliminating a platform member per se, or the channeled frame structure could be flattened if not required.

Figure 13:
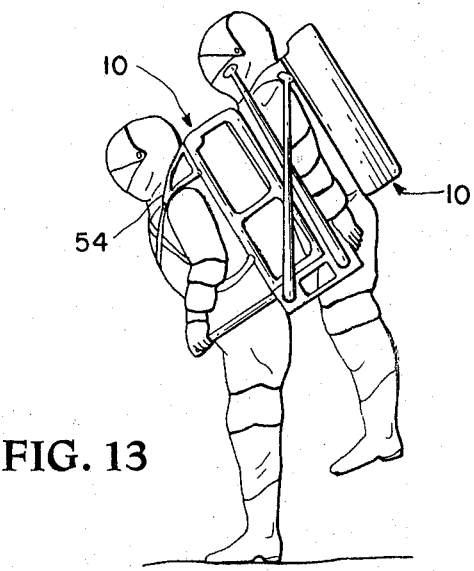
FIG. 13 is a side elevation of the backpack carrier used for a rescue mission.
Figure 11:
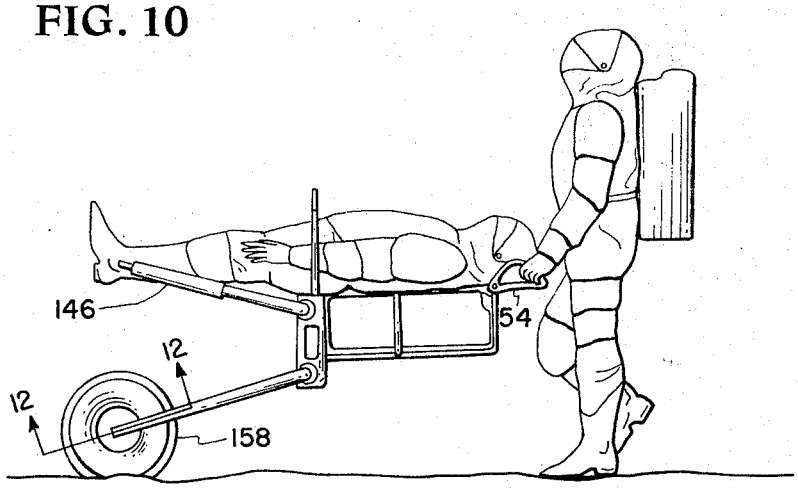
FIG. 11 is a side elevation of the backpack carrier converted to a wheeled rescue vehicle.

A further use of the backpack carrier as a rescue device is shown in FIGS. 11 and 13.

Figure 4:
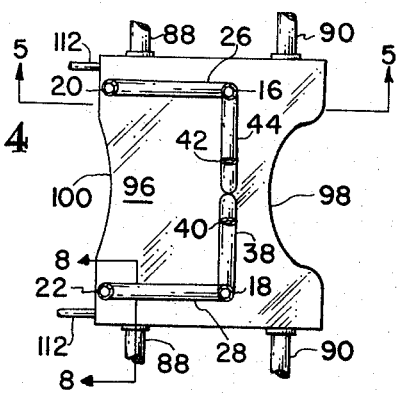
FIG. 4 is a fragmentary view of the section taken at the point 4—4 of FIG. 2.

In FIG. 13, a disabled astronaut is treated as a load, and is strapped to the carrier frame, contour 98, as shown in FIG. 4, above mentioned, aids in this result. Since the system is supported, this task may be accomplished by a single rescuer. Due to the inherent efficiency of loads so deployed, as above discussed, a single rescuer can easily transport a disabled human for considerable distances.

Figure 12:
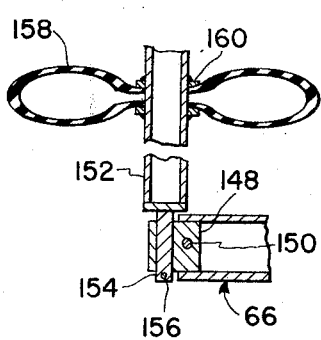
FIG. 12 is a sectional view taken along the line 12—12 in FIG. 11.

FIG. 11 shows the backpack carrier converted to a wheeled rescue device. The shoulder supports are utilized as handles, while a cloth strap 146 disposed on the front legs 66 forms a second support surface. A wheel and axle assembly, as shown in FIG. 12 completes the conversion. A pair of plugs 148 are pinned at 150 to the rear legs 68, after removal of the ball-jointed feet, with a tubular axle member 152 disposed with pins 154 attached thereto passing through openings provided in plugs 148. The assembly is retained by pins 156. A flexible inflatable wheel 158 is secured to a rim 160, which in turn is fixed to axle tube 152. The wheel may be stowed with pressure contained therein in a collapsed state by means of a restraining mechanism (not shown) and allowing the wheel to expand upon release to form the wheel in its operative state. Thus a disabled astronaut may easily be transported for great distances by the same basic structure which forms backpack carrier of the present invention.

Thus a structure has been provided which allows assumption of relatively heavy loads with a minimum of initial effort, and with very little manipulation and movement of the wearer's body, and requiring a minimum of dexterity on the part of the user. This same structure also is versatile and is usable in a variety of ways, such as a work platform and rescue vehicle. It also is usable by a wearer who is already encumbered by an essential back load, such as a life support system, without unduly shifting the center of gravity away from the back of the user.

What is claimed and desired to be secured by Letters Patent of the United States is:

1. A backpack carrier for a human being comprising:
   a carrier frame;
   means for detachably securing said frame to a wearer;
   supporting means for supporting said carrier frame on a surface at a level above the surface substantially alined with the back of a human being standing on the surface;
   means drivingly connecting said carrier frame and said supporting means, whereby said frame may be assumed by a wearer without bending or the use of external agencies,
   said supporting means including a plurality of leg members, and further including means positioning said leg members extending from said carrier frame, said means drivingly connecting said support means and said carrier frame drivingly connecting said plurality of leg members and said carrier frame,
   said positioning means including retraction means for varying the position of at least one leg member with respect to said carrier frame,
   said retraction means including control means for selectively retracting said at least one leg member and including at least one operating member disposed extending away from said backpack carrier at a substantial angle to said leg members in their extended position, and means producing activation of said retraction means in response to movement of said operating member, whereby said retraction means may be controlled by a wearer with the backpack carrier assumed.

2. The structure of claim 1 wherein said retraction means includes a pivotal connection between said at least one leg member and said means drivingly connecting said carrier frame and said leg members, whereby movement of said at least one leg member is allowed from said position extending from said carrier frame to a folded position substantially coextensive with said carrier frame.

3. The structure of claim 1 wherein said retraction means includes a rack connected to said at least one operating member, a pinion connected to said at least one leg member and means slidably supporting said operating member with said rack engaging said pinion, whereby sliding movement of said operating member rotates said at least one leg member about its pivotal connection.

4. The structure of claim 1 wherein said means drivingly connecting said leg members to said carrier frame includes a platform member secured to said carrier frame having a substantially planar surface extending at a substantial angle of said legs in their extended position, whereby a convenient working surface is provided.

5. A backpack carrier for a human being comprising:
   a carrier frame assembly having surfaces defining a roughly planar area substantially the size of a human back;
   means for securing said carrier frame to a wearer with said surfaces disposed on the wearer's back;
   a plurality of leg members;
   means drivingly connecting said leg members to said carrier frame;
   retraction means providing for movement of said leg members with respect to said carrier frame;
   control means including a pair of operating members disposed extending from said backpack carrier at a substantial angle to said planar area;

activation means providing for said movement of at least one leg member in response to movement of a respective operating member, whereby retraction of said legs may be accomplished by the wearer with the load assumed; and said carrier frame including a cavity extending into the planar area, whereby said carrier frame may be emplaced over loads already in place on the wearer.

References Cited

UNITED STATES PATENTS

| | | |
|---|---|---|
| 1,727,008 | 9/1929 | Fauver. |
| 2,140,688 | 12/1938 | Cohn. |
| 3,057,655 | 10/1962 | Weil et al. _____ 296—20 |

FOREIGN PATENTS 111,048    9/1925    Switzerland.

GERALD M. FORLENZA, Primary Examiner

U.S. Cl. X.R.

224—6